United States Patent
Reed et al.

(10) Patent No.: US 7,204,132 B2
(45) Date of Patent: Apr. 17, 2007

(54) METHOD FOR DETERMINING VALVE DEGRADATION

(75) Inventors: Dennis C. Reed, Dexter, MI (US); Thomas W. Megli, Dearborn, MI (US); Vince Winstead, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 11/116,507

(22) Filed: Apr. 28, 2005

(65) Prior Publication Data

US 2006/0243040 A1 Nov. 2, 2006

(51) Int. Cl.
    *G01M 15/00* (2006.01)
(52) U.S. Cl. ........................................ 73/116
(58) Field of Classification Search ............... 73/116, 73/117.2, 117.3, 118.1, 23.31
    See application file for complete search history.

(56) References Cited

U.S. PATENT DOCUMENTS

| | | | |
|---|---|---|---|
| 5,060,604 A | | 10/1991 | Seki et al. |
| 5,531,100 A | * | 7/1996 | Mezger et al. ............... 73/47 |
| 5,549,080 A | | 8/1996 | Uchikawa |
| 6,401,684 B2 | | 6/2002 | Hori et al. |
| 6,481,269 B2 | * | 11/2002 | Maruta et al. ............... 73/116 |
| 6,711,944 B2 | * | 3/2004 | Maruta et al. ............... 73/116 |
| 6,763,707 B2 | * | 7/2004 | Kumagai et al. .......... 73/117.3 |
| 7,069,142 B2 | * | 6/2006 | Keller et al. ................ 701/114 |
| 2002/0007668 A1 | * | 1/2002 | Maruta et al. ............... 73/116 |
| 2005/0126524 A1 | * | 6/2005 | Funke et al. ............. 123/90.15 |

* cited by examiner

*Primary Examiner*—Eric S. McCall
(74) *Attorney, Agent, or Firm*—Donald J. Lewis; Allan J. Lippa

(57) ABSTRACT

A system and method for determining valve degradation is presented. According to the method, valve timing can be adjusted in a number of ways to improve the possibility of detecting a degraded valve.

21 Claims, 9 Drawing Sheets

METHOD FOR DETERMINING VALVE DEGRADATION

FIELD

The present description relates to a method for controlling randomly activated valves operating in a cylinder of an internal combustion engine to determine valve degradation.

BACKGROUND

One method to control intake and exhaust valve operation during engine operation is described in U.S. Pat. No. 6,401,684. This method presents a means to operate a cylinder when valve operation in a specific cylinder becomes abnormal. The approach attempts to deactivate a cylinder when a lift quantity sensor indicates an abnormality. Upon indication of an abnormality, fuel is stopped to the specific cylinder, other unaffected cylinder valves may be commanded to closed positions, and ignition spark may be delayed or inhibited. By deactivating the cylinder, the method attempts to reduce engine misfires, emissions, and engine degradation.

The above-mentioned method can also have a disadvantage. Namely, the method simply attempts to determine valve anomalies in operating cylinders. That is, the method fails to recognize that degraded valve operation in deactivated cylinders can also be undesirable. For example, some engines have selected cylinders that may be deactivated to improve engine efficiency by reducing engine pumping work and by improving the thermal efficiency of the operating cylinders. However, if valves in the deactivated cylinder exhibit degraded performance, engine pumping work can increase in the deactivated cylinders, thereby reducing engine efficiency. Furthermore, if degraded valve operation is present in deactivated cylinders, excess air may be allowed to pass from the intake manifold to a catalyst. This can increase engine emissions, NOx in particular, since the oxygen in air may be preferentially stored by a catalyst, thereby occupying potential reduction sites and thus lowering the reduction rate of NOx.

The inventors herein have recognized the above-mentioned disadvantages and have developed a method of electromechanical valve control that offers substantial improvements.

SUMMARY

One embodiment of the present description includes a method to determine valve degradation for a valve that may control flow of a cylinder for an internal combustion engine, the method comprising: deactivating a cylinder by stopping fuel flow to said cylinder; commanding at least a valve from a first group of valves to a closed position for at least a cycle of said cylinder, after stopping said fuel flow to said cylinder; opening and closing at least a valve from a second group of valves during said cycle of said cylinder, and sensing engine exhaust gases for an indication of a degraded valve in said first group.

Degraded operation of a valve may be identified in a non-combusting cylinder by selectively operating a different valve in the cylinder. In one example, the state of mechanically deactivated exhaust valves may be determined by operating one or more intake valves during at least a portion of a cylinder cycle. By operating at least an intake valve after commanding exhaust valves closed, exhaust valve degradation may be determined by sampling exhaust gases. In other words, if exhaust valve degradation is present, intake valves can be operated in a deactivated cylinder such that air may be pumped through a deactivated cylinder and sensed in the exhaust stream by an oxygen sensor. In this way, it may be possible to detect increased cylinder pumping work of deactivated cylinders. In addition, valve timing can be adjusted for the deactivated cylinder such that a small amount of air may be expelled to the exhaust so that the possibility of disturbing the catalyst state may be reduced.

Further, in another example, intake valves may be commanded closed and exhaust valves may be operated so that it can be determined if intake valve degradation may be present. Similar to the description above, intake valve degradation may be determined by pumping air through a cylinder and into the exhaust system. However, in this example, the degradation of intake valves may be determined by air that may pass by the commanded closed intake valves and the operating exhaust valves.

The present description may provide several advantages. In particular, the approach may improve engine emissions by limiting cylinder deactivation when valve degradation may be present in deactivated cylinders. In addition, the method may be used to identify increased cylinder pumping work and/or a specific source that may be reducing fuel economy during cylinder deactivation so that fuel economy may be improved, degraded valve operation for example.

The above advantages and other advantages, and features of the present description will be readily apparent from the following Detailed Description when taken alone or in connection with the accompanying drawings.

BRIEF DESCRIPTION OF THE DRAWINGS

The advantages described herein will be more fully understood by reading an example of an embodiment, referred to herein as the Detailed Description, when taken alone or with reference to the drawings, wherein.

DETAILED DESCRIPTION

Figure 1:
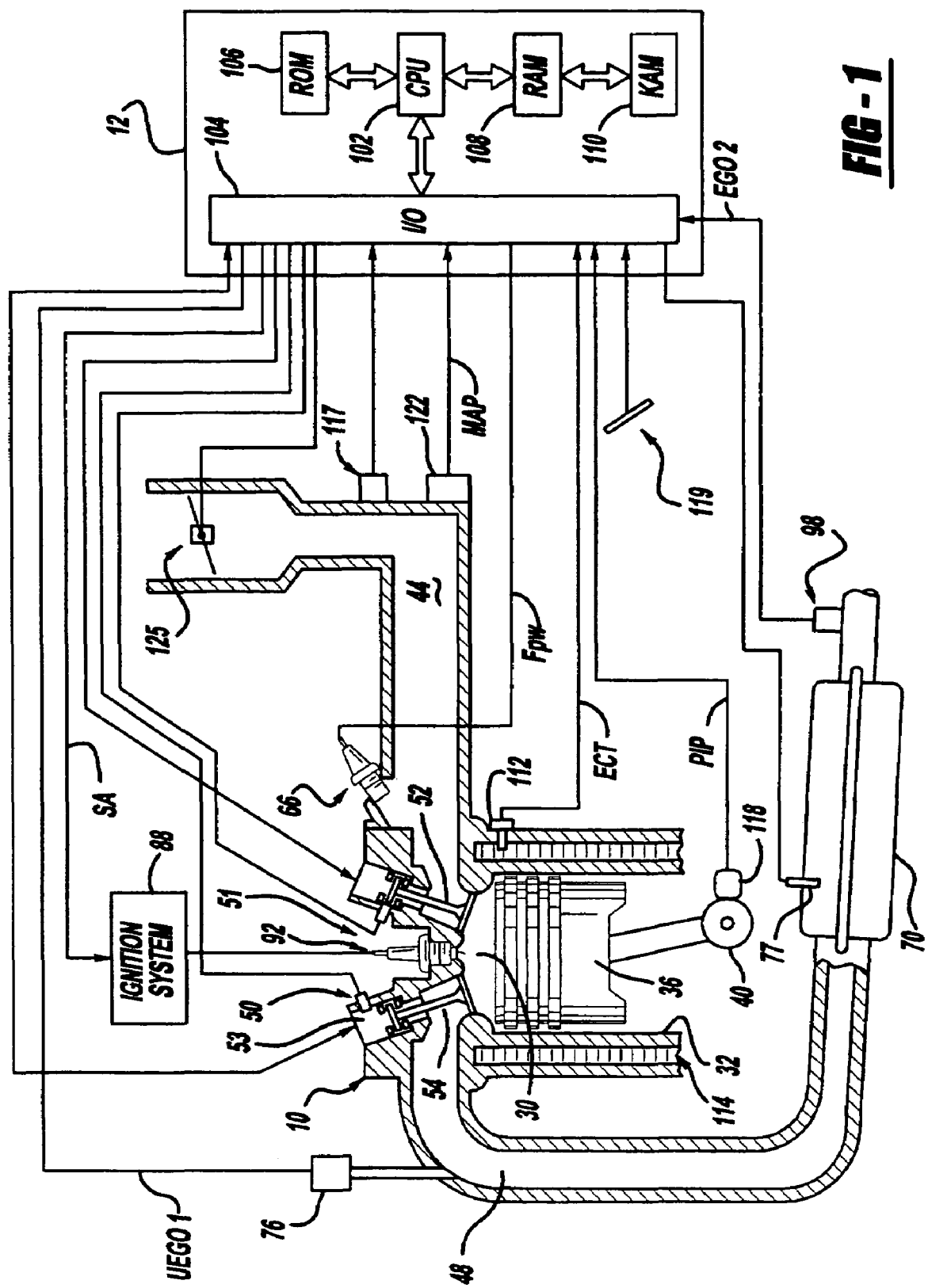
FIG. 1 is a schematic diagram of an engine.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is known communicating with intake manifold 44 and exhaust manifold 48 via respective intake valve 52 an exhaust valve 54. Each intake and exhaust valve is operated by an electromechanically controlled valve coil and armature assembly 53. Alternatively, one or more of the intake 52 and/or exhaust 54 valve may be cam actuated, and may be capable of mechanical deactivation. For example, lifters may include a deactivation mechanism for push-rod type cam actuated valves. Alternatively, deactivators in an overhead cam may be used, such as by switching to a zero-lift profile. Armature temperature can be determined by temperature sensor 51. Valve position can be determined by position sensor 50. Valve position may be determined by linear variable displacement, discrete, or optical transducers or from actuator current measurements. In an alternative example, each valve actuator for valves 52 and 54 has a position sensor and a temperature sensor. In yet another alternative example, armature temperature may be determined from actuator power consumption since resistive losses can scale with temperature.

Intake manifold 44 is also shown having fuel injector 66 coupled thereto for delivering liquid fuel in proportion to the pulse width of signal FPW from controller 12. Fuel is delivered to fuel injector 66 by fuel system (not shown) including a fuel tank, fuel pump, and fuel rail (not shown). Alternatively, the engine may be configured such that the fuel is injected directly into the engine cylinder, which is known to those skilled in the art as direct injection. In addition, intake manifold 44 is shown communicating with optional electronic throttle 125.

Distributorless ignition system 88 provides ignition spark to combustion chamber 30 via spark plug 92 in response to controller 12. Universal Exhaust Gas Oxygen (UEGO) sensor 76 is shown coupled to exhaust manifold 48 upstream of catalytic converter 70. Alternatively, a two-state exhaust gas oxygen sensor may be substituted for UEGO sensor 76. Two-state exhaust gas oxygen sensor 98 is shown coupled to exhaust manifold 48 downstream of catalytic converter 70. Alternatively, sensor 98 can also be a UEGO sensor. Catalytic converter temperature is measured by temperature sensor 77, and/or estimated based on operating conditions such as engine speed, load, air temperature, engine temperature, and/or airflow, or combinations thereof.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, and read-only-memory 106, random-access-memory 108, 110 Keep-alive-memory, and a conventional data bus. Controller 12 is shown receiving various signals from sensors coupled to engine 10, in addition to those signals previously discussed, including: engine coolant temperature (ECT) from temperature sensor 112 coupled to water jacket 114; a position sensor 119 coupled to a accelerator pedal; a measurement of engine manifold pressure (MAP) from pressure sensor 122 coupled to intake manifold 44; a measurement (ACT) of engine air amount temperature or manifold temperature from temperature sensor 117; and a engine position sensor from a Hall effect sensor 118 sensing crankshaft 40 position. In a preferred aspect of the present description, engine position sensor 118 produces a predetermined number of equally spaced pulses every revolution of the crankshaft from which engine speed (RPM) can be determined.

Figure 2A:
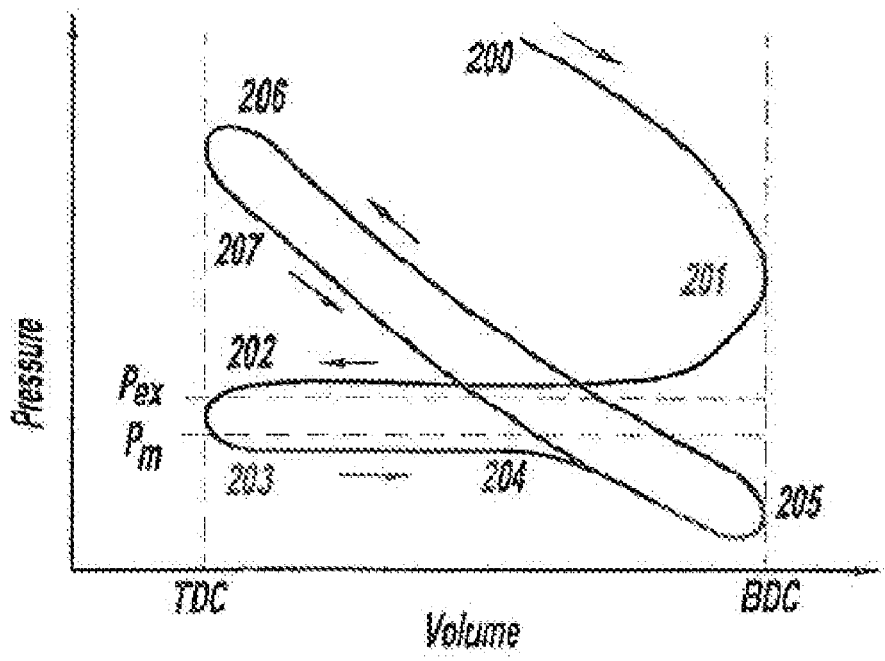
FIG. 2a is an illustrative cylinder cycle P-V diagram for a cylinder having deactivated exhaust valves.

Referring to FIG. 2a, an illustrative cylinder cycle P-V diagram for a cylinder having deactivated exhaust valves that may be held in a closed position is shown. The x axis represents cylinder volume while the y axis represents cylinder pressure. The illustrated cycle shows cylinder pressure falling 200 as the piston moves toward bottom-dead-center (BDC) during a power stroke. The exhaust stroke begins near location 201 and ends near 202 where the cylinder pressure approaches the exhaust system pressure $P_{ex}$. The intake valve opens near top-dead-center (TDC) 203 and the cylinder pressure is brought near intake manifold pressure $P_m$. Intake manifold air is inducted into the cylinder until the intake valve closes 204 so that induction event duration is approximately 90° (0 to 90° after TDC). However, the intake valve opening can occur within a range of −25° to 25° from TDC, and the intake valve may be closed within a range of 20° to 100° from TDC. Operating the intake valve in this manner can reduce unwanted expansion of gas from the cylinder to the intake manifold. Following the intake stroke, the piston compresses the air charge until top-dead-center (TDC) is reached 206 and then expands from 207 returning to 204. The path from 205-206-207-205 may be followed as long as the cylinder intake and exhaust valves are kept closed. However, the cylinder pressure may decay if air leaks from the cylinder during pumping.

In addition, the intake valve timing can be adjusted in response to engine operating conditions to regulate the amount of air entering the cylinder during each cylinder cycle so that a desired pressure may be attained in the cylinder. In other words, the cylinder pressure may be increased or decreased during cylinder deactivation by operating intake valves and adjusting or varying intake valve timing. This can allow the exhaust valves to be evaluated for degradation over a wider range of cylinder operating conditions. The ability to control cylinder air amount during valve evaluation provides a means to limit oxygen flow to an exhaust catalyst when exhaust valve degradation may be present.

Furthermore, during cylinder deactivation, intake timing can be adjusted so that the intake valve opens near TDC (intake stroke) and closes after BDC (intake stroke). This can allow the intake valve to regulate cylinder air charge during the compression stroke and to limit the amount of intake port fuel puddle that may be inducted into the cylinder. By using late intake valve closing (IVC), engine pumping can be reduced while controlling a cylinder air amount, at least during some conditions, during valve degradation evaluation.

Figure 2B:
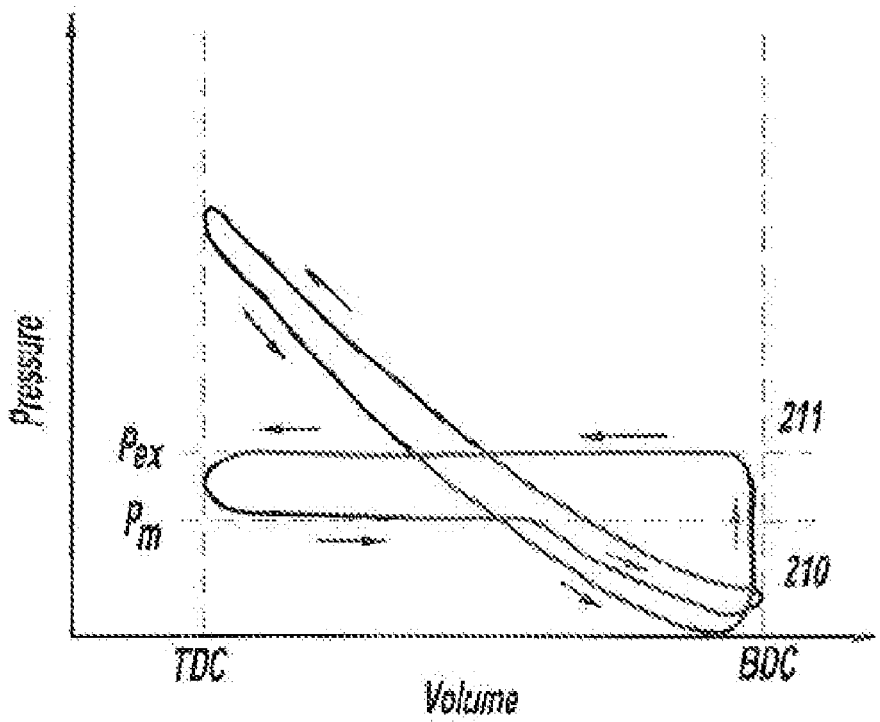
FIG. 2b is an illustrative cylinder cycle P-V diagram for a cylinder having degraded exhaust valves and operating in a cylinder deactivation mode.

Referring to FIG. 2b, an illustrative cylinder cycle P-V diagram of a cylinder having one example of degraded deactivated exhaust valves is shown. In particular, exhaust valves that have been commanded closed continue to open and close. During compression and expansion strokes the cylinder P-V trajectory follows a path similar to a cylinder where the exhaust valves are set to a closed position.

However, during the exhaust stroke, cylinder pressure increases from 210 to 211 because the plot indicates that the exhaust valves open and allow flow between the cylinder and the exhaust manifold. By opening the exhaust valves, the area under the P-V cycle increases, thereby indicating that cylinder pumping work can increase if degraded exhaust valves conditions exist. By determining valve degradation, pumping losses that may occur during cylinder deactivation modes may be reduced. In addition, the operating exhaust valves may allow air to flow into the exhaust system which may be undesirable.

Figure 3:
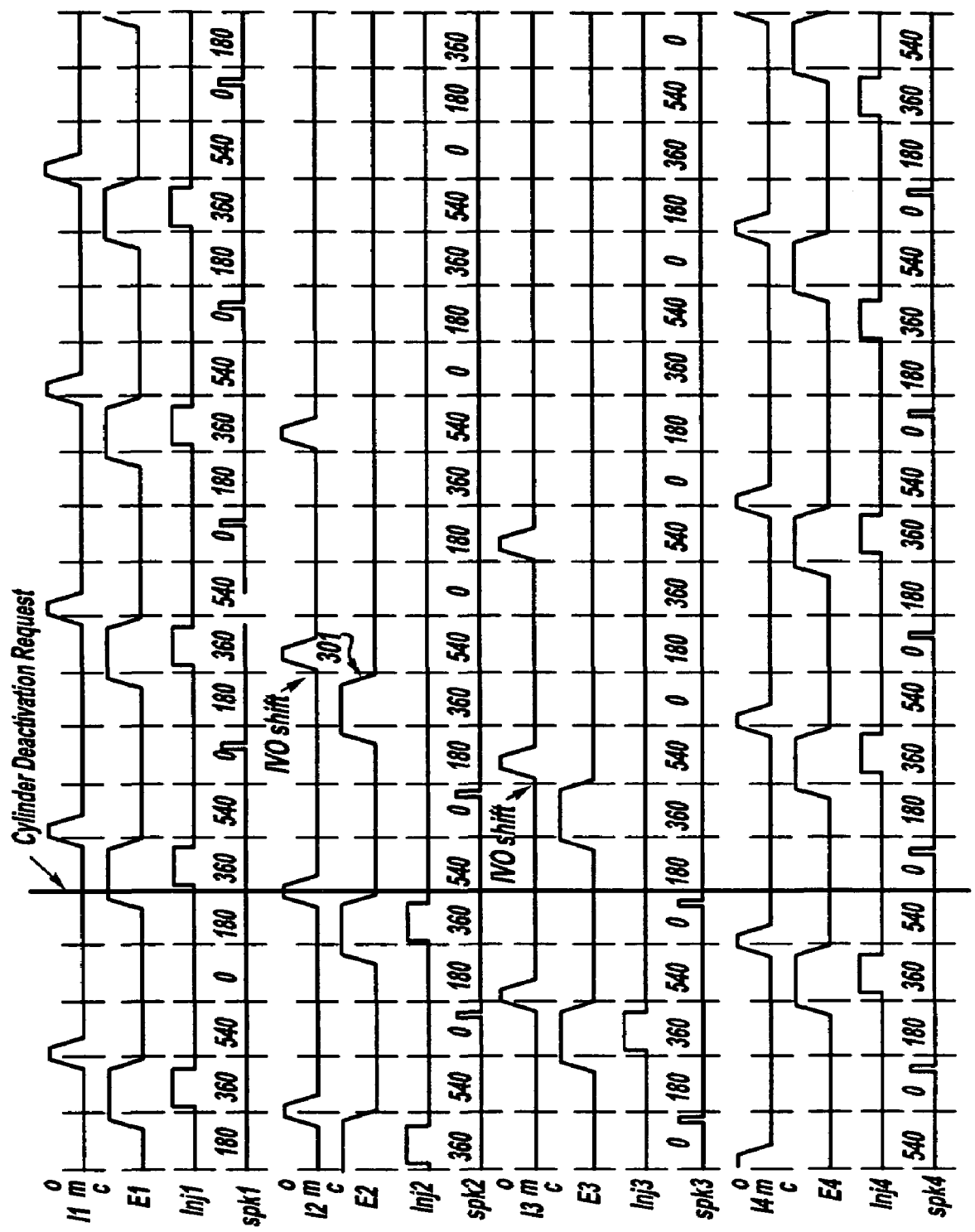
FIG. 3 is an example timing sequence of simulated commanded valve events that shows valve events that may be used to determine valve degradation for two cylinders of a four cylinder engine.

Referring to FIG. 3, an example timing sequence that shows simulated commanded valve events that can be used to determine exhaust valve degradation.

Representative commanded valve events, spark timing, and fuel timing are shown before and after a cylinder deactivation request. The commanded valve event signals represent the approximate desired valve position but not necessarily the actual position of the valve or the many possible variants that may provide similar function. For example, E1 represents the commanded desired exhaust valve position. However, actual valve position may deviate from the commanded position during some conditions, if an electrically actuated valve is driven by a current amount that may be lower than a current amount that may be sufficient to open a valve, or if a mechanical device may not completely engage an exhaust valve deactivation mechanism, for example.

The illustrated signals represent signals that may be of interest when deactivating two cylinders of a four cylinder engine. A crankshaft position marker is displayed for cylinders 1–4 and is embedded between vertical markers that indicate BDC or TDC. The numbers represent degrees reference to TDC compression stroke for the mark right of the number. The intake valve timing is represented by events labeled I1–I4 along the left hand side of the plot. Exhaust valve timing is represented by events labeled E1–E4 along the left hand side of the plot. Spark (Spk1–4) and injection (Inj1–4) timing are also shown for purposes of completeness. A cylinder deactivation request is indicated as a bold vertical line that intersects the cylinder timing signals. The actual cylinder deactivation signal may be made by evaluating logic and/or engine operating conditions within engine controller 12. The intake and exhaust valves are shown in full open (high level) and/or full closed (low level) position during cylinder cycles. However, some electrically actuated valves may hold a mid-position balanced by valve opening and closing springs, at least during some conditions. A separate processor output or signal may not be necessary to deactivate cylinders and the deactivation request in FIG. 3 represents a request to deactivate two of the four engine cylinders. However, a deactivation request may initiate the deactivation of any number of cylinders.

At the indication of a request to deactivate cylinders, cylinder 3 completes an in-process combustion cycle and then exhausts the combusted air-fuel mixture 301. Fuel injection is stopped, the exhaust valve is commanded closed, spark is stopped but it may remain active with little effect, and the subsequent intake event valve opening timing is shifted so that the intake valve opens near TDC of the intake stroke. In addition, the valve opening duration can be controlled so that the desired cylinder air charge and peak cylinder pressure may be controlled.

The one or more intake valves can continue to open and close for a predetermined number of cylinder cycles or the intake valves can be commanded closed after the first induction event following the last combustion event after the cylinder deactivation request. If valve operation is not degraded the inducted air may be substantially trapped in the cylinder during the compression, expansion, and exhaust strokes. That is, a small amount of inducted air may pass the cylinder rings or valve seat, but the majority of the inducted air remains in the cylinder. On the other hand, if valve degradation is present, exhaust valve degradation in particular, the compressing action of the piston can cause inducted air to pass the exhaust valve and enter the exhaust manifold. The presence of air in the exhaust manifold can be detected by oxygen sensor 76, thereby providing an indication of exhaust valve degradation in a deactivated cylinder.

Since air flowing through a cylinder to the exhaust can disrupt some chemical catalyst processes, it may be beneficial to restart a cylinder by performing induction and combustion events prior to opening exhaust valves. In this way, the amount of air passed to the catalyst may be reduced. Alternatively, direct injection engines may inject fuel without having opened the intake valves so that the injected fuel may be combusted with the trapped air in the cylinder. Following combustion, the exhaust valves may be opened and closed based on a prescribed firing order.

Figure 4:
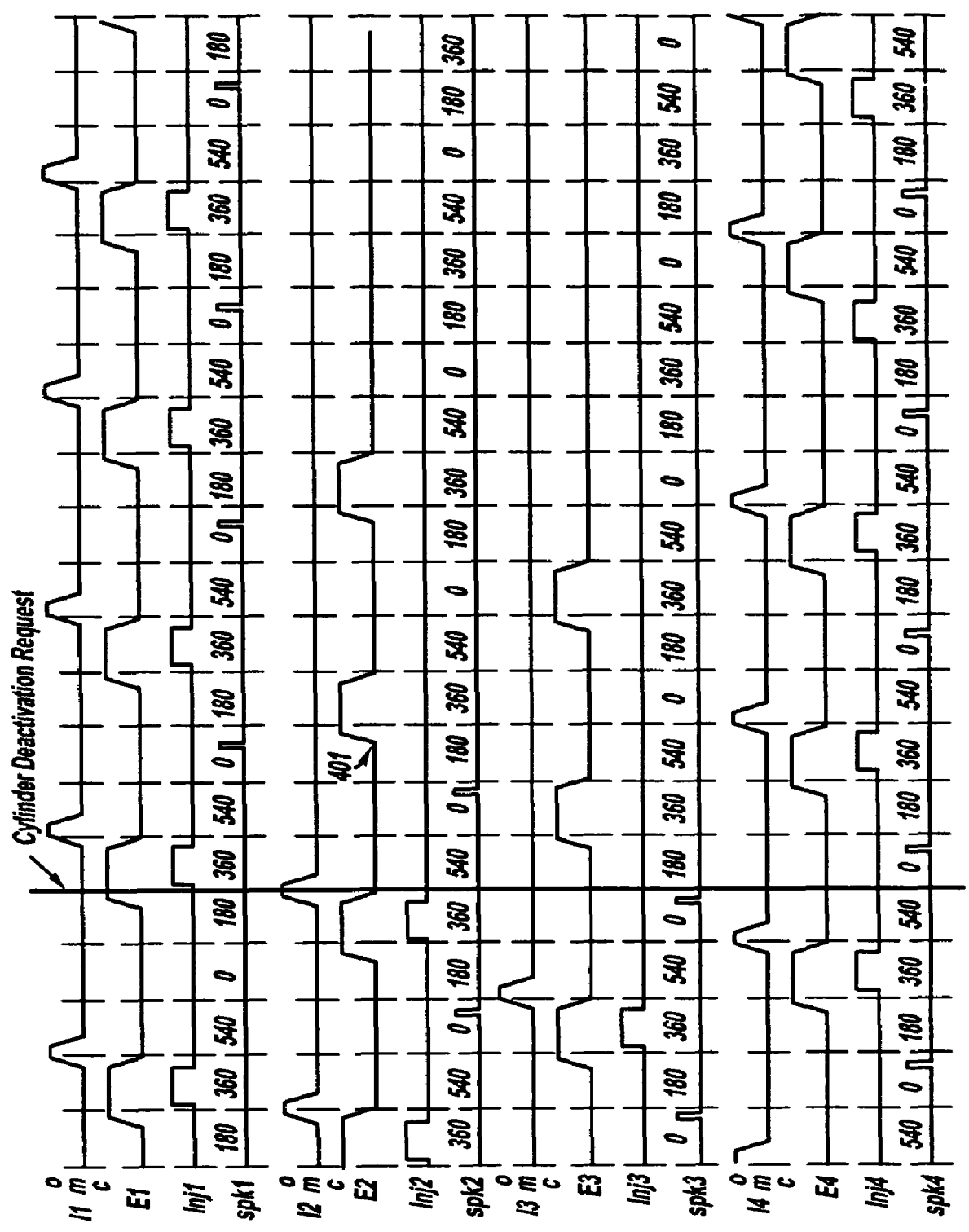
FIG. 4 is an alternate example timing sequence of simulated commanded valve events that shows valve events that may be used to determine valve degradation for two cylinders of a four cylinder engine.

Referring to FIG. 4, an example timing sequence that shows an alternative simulation of commanded valve events that can be used to determine intake valve degradation. The signals and marking are similar to those described in FIG. 3.

Intake valve degradation can be evaluated for a deactivated cylinder by commanding intake valves closed during cylinder deactivation and then operating exhaust valves according to a prescribed combustion order. Alternatively, the exhaust valves may be operated in a manner that facilitates pushing cylinder contents to the exhaust system, opening the exhaust valves when the piston is moving toward the cylinder head (compression and/or exhaust stroke) and keeping the valves open as late as 45° after TDC, for example. Intake valve degradation may be indicated by air that may be passed from the intake manifold to the exhaust manifold. As mentioned above, the presence of oxygen in the exhaust may be determined by an oxygen sensor 76, indicating intake valve degradation. When the intake valves are commanded closed and exhaust gases have been passed to the exhaust manifold, piston movement may create a vacuum in the cylinder that can encourage flow into the cylinder. Therefore, it may be possible to determine if an intake valve may be degraded during cylinder deactivation since intake manifold air may pass the intake valve, entering the cylinder, and then pass to the exhaust system during conditions of intake valve degradation. Conversely, when intake valves are commanded closed and air does not pass the intake valves the valves may be determined not to be degraded.

Continuing with FIG. 4, cylinders 2 and 3 are shown finishing the individual in-process combustion cycles and exhausting a combusted air-fuel mixture after a cylinder deactivation request. The last combustion event for cylinder 2 is exhausted at location 401. The intake valves remain closed and the exhaust valve continues to operate for another cylinder cycle based on the previously defined combustion order. Alternatively, the exhaust valves may continue to operate for a predetermined number of cylinder cycles and/or they may open and close during the compression stroke or during the compression and exhaust strokes.

During the interval between 360 and 540 the piston is in a stroke moving away from the cylinder head, namely, the intake stroke. Since the exhaust and intake valves are closed for at least a portion of this interval, the cylinder can produce a vacuum because the cylinder volume is increasing as the engine rotates. If an intake valve is degraded, air may be drawn into the cylinder from the intake manifold because of a pressure differential that may be present between the intake manifold and the cylinder.

The cylinder may be restarted by operating the intake valves to induct air, combusting an air-fuel mixture, and then allowing the exhaust valves to operate. In this way, it may be possible to reduce the amount of oxygen that may be pumped into the exhaust system after determining intake valve degradation.

If valve degradation has not been determined after the evaluation, and if the cylinder remains commanded to a deactivated state, the intake and/or exhaust valves may be commanded so that the cylinder may induct air or exhaust. The inducted air or exhaust can be trapped in the cylinder by closing the valves so that a positive cylinder pressure can be achieved over at least a portion of the piston cycle. One method to produce positive cylinder pressure may be to open intake or exhaust valves while the piston is traveling away from the cylinder head. This can allow the cylinder to be near intake or exhaust manifold pressure while the cylinder volume is large. Consequently, the cylinder pressure can be positive over a large portion of the cylinder cycle.

Figure 5:
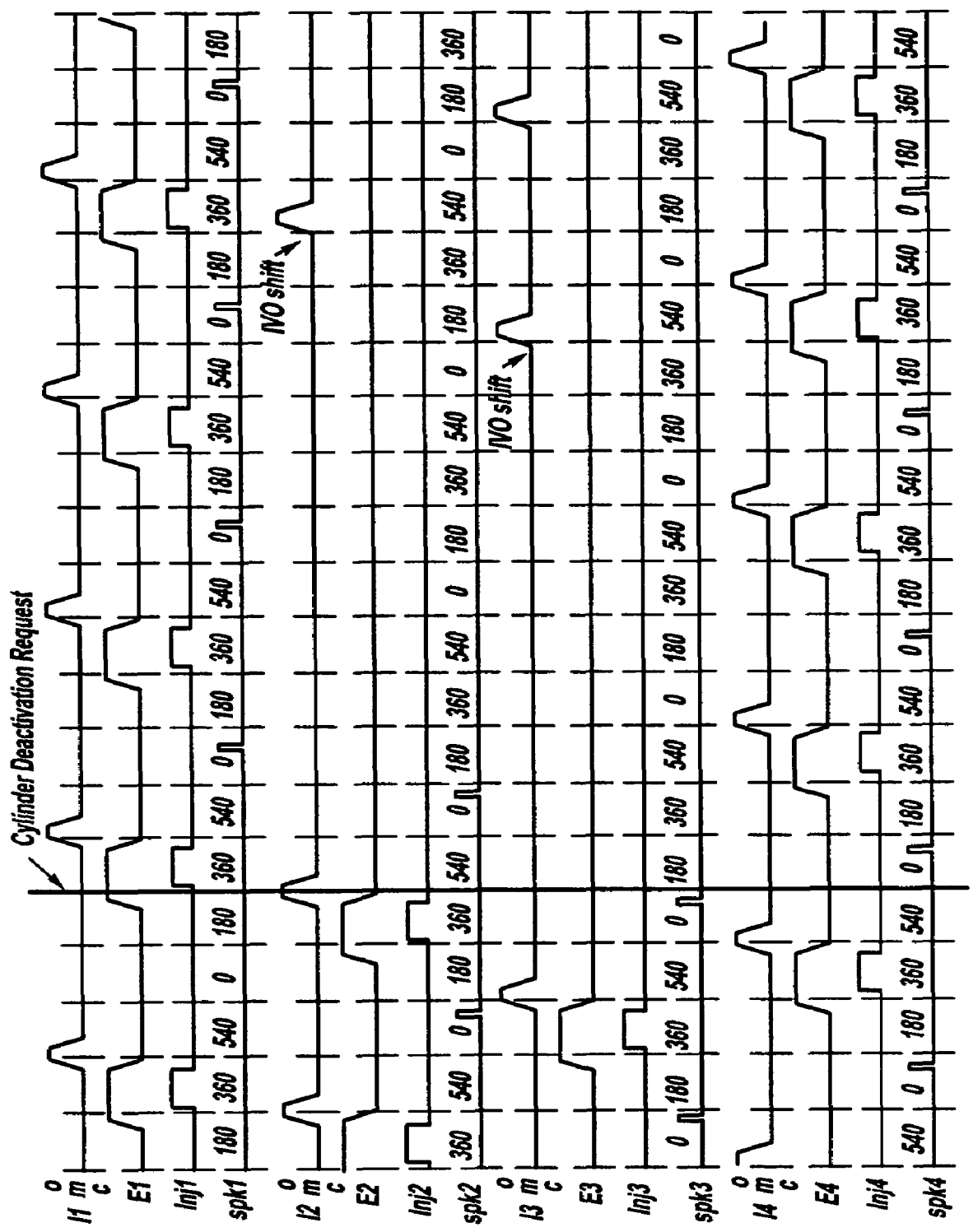
FIG. 5 is an alternate example timing sequence of simulated commanded valve events that shows valve events that may be used to determine valve degradation for two cylinders of a four cylinder engine.

Referring to FIG. 5, an example timing sequence that shows another alternative simulation of commanded valve events that can be used to determine exhaust valve degradation. The signals and identification markings are similar to those shown in FIGS. 3 and 4.

It may be desirable during some conditions to retain the combusted gases in the cylinder after a cylinder deactivation request has been made. By retaining exhaust gases, the cylinder pressure can be positive so that flow into the cylinder may be reduced. This may be beneficial since less oil may be drawn into the cylinder than if the cylinder were in a state of vacuum.

Continuing with FIG. 5, cylinders 2 and 3 complete the combustion cycle that started before the request to deactivate cylinders is made. The intake and exhaust valves remain closed after the combustion event (indicated by the spark event) to trap the combusted air-fuel mixture. After a predetermined number of cylinder cycles or in response to a sensor signal (e.g., cylinder pressure sensor, temperature sensors, and/or engine speed sensor), the intake valves may be restarted so that the exhaust valves can be evaluated for degradation. By waiting to reactivate intake valves, pressure in the cylinder may be reduced so that combusted gases flowing into the intake manifold during intake valve operation may be reduced. The air inducted into the cylinder by opening the intake valves can be compressed by the piston so that exhaust valves can be evaluated by sensing oxygen in the exhaust system. Similar to the method mentioned in the description of FIG. 3, the intake valve may be operated for a predetermined number of events during the exhaust valve degradation evaluation process. In addition, the cylinders may be restarted by operating intake valves, combusting an air-fuel mixture, and then operating the exhaust valves. This sequence can reduce the amount of oxygen that may be pumped into the exhaust system when determining degradation of exhaust valves.

Figure 6:
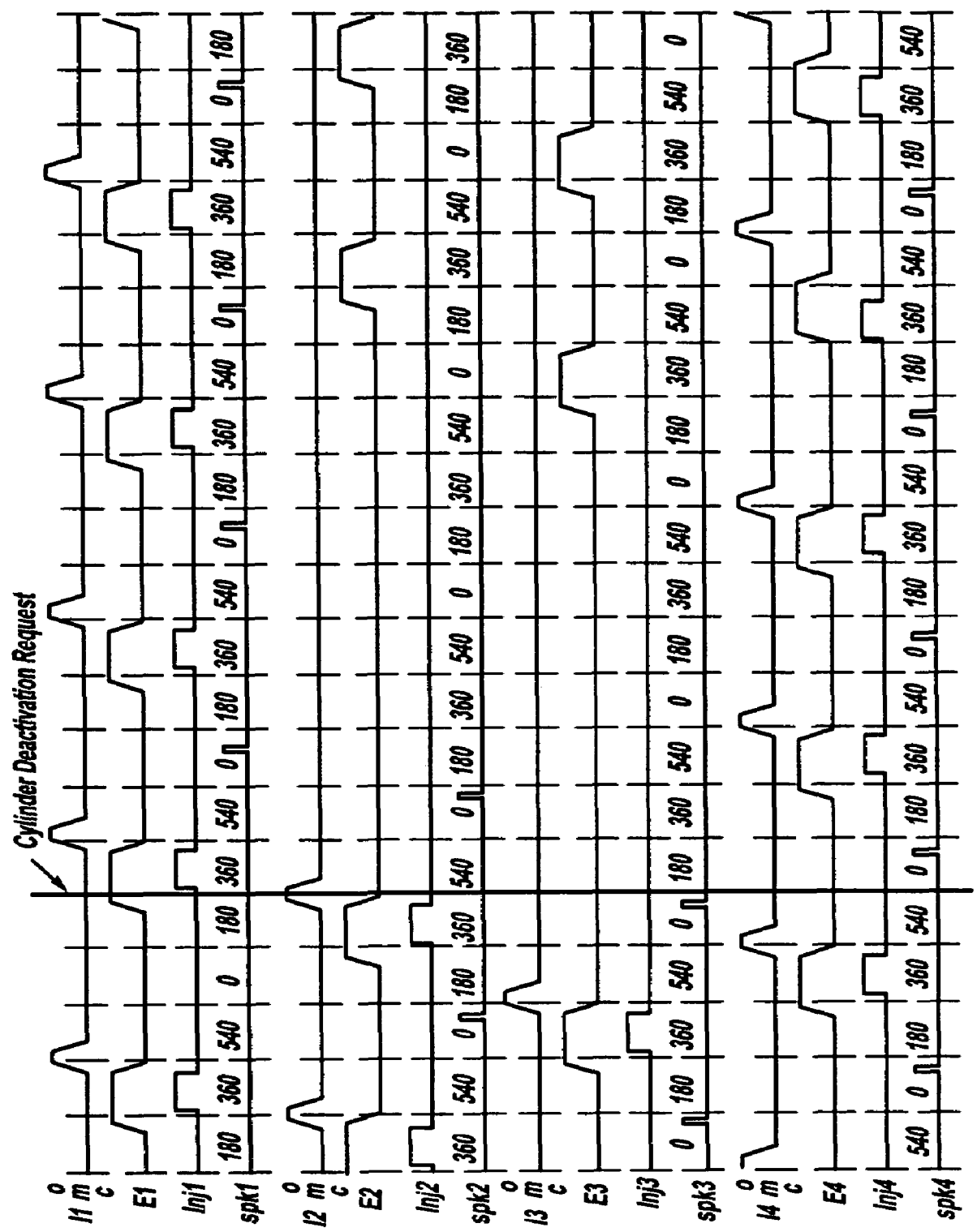
FIG. 6 is an alternate example timing sequence of simulated commanded valve events that shows valve events that may be used to determine valve degradation for two cylinders of a four cylinder engine.

Referring to FIG. 6, an example timing sequence that shows another alternative simulation of commanded valve events that can be used to determine intake valve degradation. The figure shows that cylinders 2 and 3 complete in-process combustion cycles (indicated by the spark signal) and then hold exhaust and intake valves in closed positions. This sequence can trap exhaust gasses in the cylinder for the before-mentioned benefits. After a predetermined number of cylinder cycles or in response to a sensor signal, the exhaust valves may be operated and the intake valves may be evaluated for degradation. Similar to the description of FIG. 4, the exhaust valves can be operated relative to piston position so that a vacuum may be produced in the cylinder. Pressure may be lower in the cylinder than in the intake manifold, at least during a portion of the cylinder cycle, so that an opening between the cylinder and the intake manifold can cause flow from the intake manifold to the cylinder. For example, if the intake valve is degraded air may be drawn from the intake manifold to the cylinder and then pushed to the exhaust system when the exhaust valves open. An oxygen sensor located in the exhaust may be capable of sensing this oxygen and a determination of intake valve degradation may be made based on the sensed oxygen.

In this sequence the exhaust valves may be held in a closed position if no degradation has been determined, at least until the cylinder is reactivated.

As mentioned in the description of FIG. 3, it may be desirable to control the cylinder pressure by intake or exhaust valve timing so that a positive pressure may be maintained for at least a portion of the piston cycle. Consequently, it may also be desirable to evaluate intake valves using vacuum and then to readjust valve timing so that a positive pressure may be maintained within the cylinder for at least a portion of the cylinder cycle.

In other embodiments, a predetermined number of additional combustion cycles, for one or more of the cylinders to be deactivated, can take place after a cylinder deactivation request for the methods described by FIGS. 3–6. Fuel puddles may be produced in an intake port because injector targeting can cause fuel to impact and attach to port walls. The fuel puddles may make cylinder air-fuel control difficult when a cylinder is restarted because the fuel puddle mass can be difficult to predict. Consequently, it may be desirable to reduce fuel puddle mass so that a greater fraction of the fuel entering the cylinder during restart is injected fuel.

Fuel puddle reduction can be accomplished by having engine controller 12 adjust intake valve timing during one or more intake events of an individual cylinder. For example, after a request to deactivate a cylinder is made, intake valve opening can be retarded so that the intake air velocity increases and pulls an increased amount of the fuel puddle into the cylinder. The cylinder valves may be evaluated by any of the preceding methods to determine valve degradation after a predetermined number of intake valve shifted combustion events have occurred.

In addition, the methods described by FIGS. 3–6 can also include opening the intake or exhaust valves during degradation evaluation more than once during a 720° cylinder cycle. Specifically, the valves opposite (i.e., intake valves are opposite exhaust valves and vice versa) the valves being evaluated for degradation can be opened and closed more than once during a cylinder cycle. For example, using 4-stroke timing as a basis, an intake valve can be open between 350°–550° and between 710°–190° (referenced to 0° at TDC compression stroke). In other words the intake valve can be opened during the intake and power strokes of a 4-cycle cylinder. Likewise, exhaust valves can be opened more than once when intake valve are being evaluated for degradation.

Figure 7:
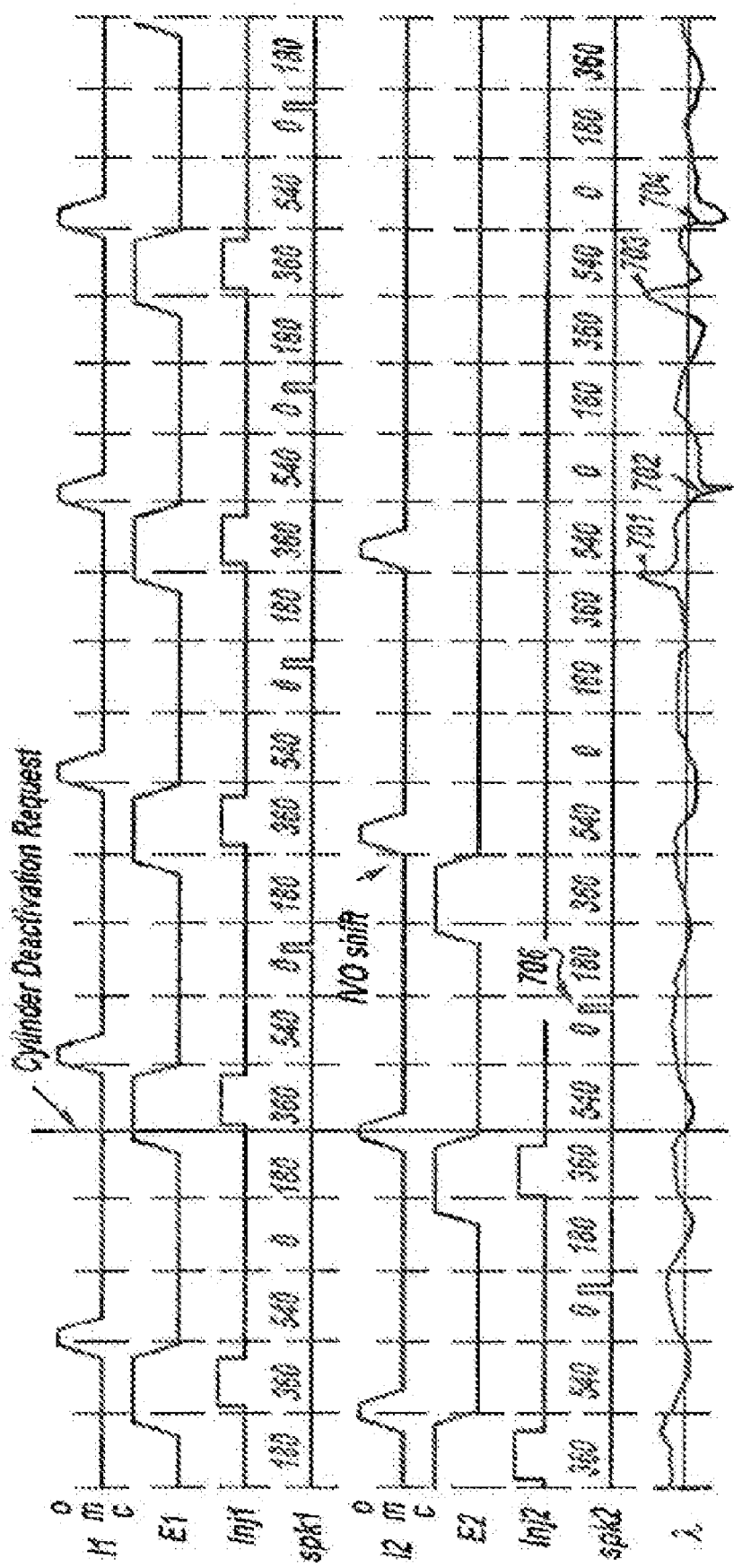
FIG. 7 is an example timing sequence of simulated valve events that shows valve events and exhaust air-fuel ratio for a cylinder having a degraded valve.

Referring to FIG. 7, an example timing sequence of simulated intake and exhaust commanded valve events, fuel injection, spark, and exhaust air-fuel ratio for a cylinder having a degraded exhaust valve is shown. The signals and position markers are similar to those of FIGS. 3–6, but only cylinders 1 and 2 of a four cylinder engine are shown. A cylinder deactivation request is made, indicated by the vertical marker, causing commands to deactivate cylinder 2. The cylinder can be deactivated by stopping fuel flow to the cylinder. In addition, spark may be stopped and valves held in a closed position closing as part of the deactivation process. The figure shows gasses from the last combustion event (indicated by the spark signal 706) being pushed from the cylinder to the exhaust during the last exhaust valve opening event. The intake valves continue to operate after the last exhaust event so that air may flow from the intake manifold, through the cylinder, and into the exhaust system. The exhaust air-fuel ratio, indicated by the $\lambda$ symbol, is shown oscillating about lambda=1. At location 701 a lean air-fuel excursion is shown, followed by a rich air-fuel excursion at location 702. Although the exhaust valve may be commanded closed, a lean air-fuel excursion can be observed in the exhaust gas mixture. This can be an indication that a commanded closed exhaust valve deactivating mechanism may not have completely engaged and thus allowed the exhaust valve to continue to open and close, for example. Alternatively, an off-trajectory electrically actuated valve may be in a middle balance position instead of a held closed position in another example. The exhaust air-fuel deviates lean again at position 703 in sequence with a subsequent exhaust stroke.

As mentioned above, it may be undesirable to push oxygen from the intake manifold to the exhaust system catalyst during some conditions. However, exhaust and/or intake valve timing (i.e., valve opening duration or the valve open position relative to crankshaft position) can be used to limit the amount of induced air that may be passed to the exhaust system. By controlling the intake and/or exhaust valve timing, it may be possible to determine valve degradation, even when valve degradation may be present, without substantially disturbing the catalyst operating state. In addition, the catalyst oxygen state may be reestablished by quickly following the lean event by enriching air-fuel in an operating cylinder. By controlling fuel enrichment in a subsequent combusting cylinder an oxygen disturbance may be compensated. For example, the exhaust air-fuel concentration observed by sensor 76 can be multiplied by cylinder mass flow through the engine to estimate a lean oxygen mass entering the exhaust. Then, fuel may be added to the base fuel amount (desired fuel-air amount multiplied by cylinder air charge) so that the exhaust gas air-fuel can be enriched by a fuel amount that balances the oxygen mass flow into the exhaust near a stoichiometric level. In other words, compensation of a subsequent combusting cylinder air-fuel can be used to regulate the oxygen mass flowing into the exhaust as if the exhaust air-fuel was near stoichiometry. In this way, the oxygen delivered to the catalyst may be controlled while evaluating valve for degradation in a deactivated cylinder. The rich air-fuel mixture at locations 702 and 704 represent compensation for air-fuel deviations that may occur during valve evaluation for deactivated cylinders.

Figure 8:
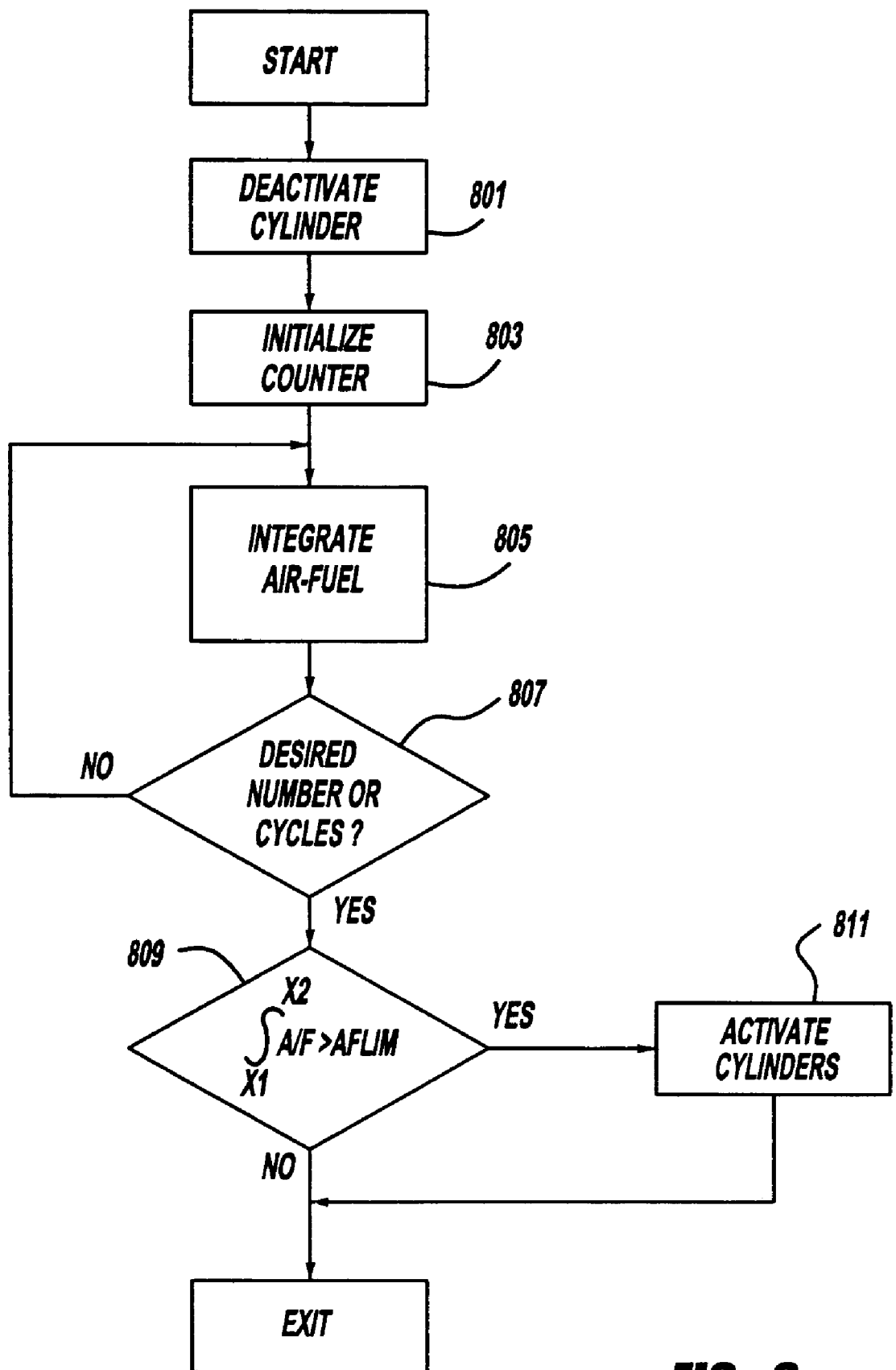
FIG. 8 is a flow chart of an example method to determine valve degradation for a deactivated cylinder.

Referring to FIG. 8, a flow chart of an example method to determine valve degradation for a deactivated cylinder is shown.

In step 801, one or more cylinders may be commanded to be deactivated and the valve degradation evaluation process started.

Typically, cylinders are activated and deactivated by control logic in response to engine operating conditions. A cylinder can be deactivated by stopping fuel flow to the cylinder, but to increase engine efficiency it can also be desirable to close cylinder valves and stop cylinder spark to improve engine emissions and fuel economy, for example.

The valve command sequences explained in the description and illustrations of FIGS. 3–6 or other combinations and modifications of the features consistent with the teachings of the present description may be commanded in step 801. That is, with the onset of cylinder deactivation, the process of determining valve degradation may begin. Alternatively, valve degradation may be assessed at an interval of predetermined cylinder deactivation cycles, after a cylinder has been deactivated five times, for example. The routine continues to step 803.

In step 803, a deactivated cylinder cycle counter is initialized. This counter can be used to determine the interval over which valve degradation may be determined. The counter is based on a four stroke cylinder cycle but can be modified to accommodate alternative cycles, two-stroke or six-stroke, for example. The routine proceeds to step 805.

In step 805, exhaust gas air-fuel ratio is integrated and intake and exhaust valves may be evaluated for degradation. Depending on the control and diagnostic objectives, intake and exhaust valves can be operated by one of the above-mentioned descriptions and illustrations of FIGS. 3–6. Integration of the exhaust air-fuel can begin before, after, or simultaneous to the valve timing adjustments.

The integrated exhaust gas can be used as an indication of valve degradation. In particular, when one of the before-mentioned valve sequences can be executed during cylinder deactivation, it may be possible to detect degradation of intake and/or exhaust valves. Since air may be directly passed through a cylinder during valve degradation evaluation, it may lean the exhaust air-fuel mixture which can be detected by oxygen sensor 76. By integrating the air-fuel sensed by oxygen sensor 76 over a predetermined crankshaft interval, a numerical value can be assigned to the amount of air-fuel deviation during the valve evaluation. This numerical value can then be compared to a predetermined value to determine valve degradation. The interval of integration may be a single cylinder cycle, a fractional cylinder cycle, or a number of cylinder cycles. In other words, the integration can be designed to integrate specific portions of one or more cylinder cycles. For example, exhaust air-fuel may be integrated during the crankshaft interval where each exhaust stroke of a particular cylinder occurs for ten engine cycles (720° per engine cycle for an engine operating in a four-stroke mode). By windowing integration over a specific crankshaft angle, it may be possible to improve detection of valve degradation for a selected cylinder since the affects of other cylinders may contribute to a smaller portion of the air-fuel signal during the window period.

In another embodiment, the integral of air-fuel multiplied by mass air flow can be calculated. This integral may provide data that can be related to cylinder volume or an indication of the level of valve degradation. Since the air-fuel measurement can be related to an oxygen concentration, the concentration can be used with mass flow rate to calculate a total mass over the interval of integration. This method may be beneficial if the mass flow rate through the engine may change during cylinder deactivation. The routine continues to step 807.

In step 807, the routine determines if air-fuel has been integrated over the desired number of cylinder cycles. If so, the routine proceeds to step 809, if not, the routine proceeds to step 805.

In step 809, valve degradation can be determined. The integrated air-fuel can be compared to a predetermined variable AFLIM. If AFLIM is less than the integrated air-fuel, valve degradation may not be determined and the routine exits. Otherwise, valve degradation is determined and the routine proceeds to step 811.

In step 811, cylinders can be reactivated. It may be undesirable to operate an engine in a cylinder deactivation mode if valve degradation has been detected. Therefore, all commanded deactivated cylinders may be commanded to be reactivated. The deactivation sequence may be reattempted for a predetermined number attempt and/or the operator may be notified that cylinder deactivation may not be available. In addition, cylinder deactivation may be inhibited if degradation is determined during a predetermined number of cylinder deactivation attempts.

Figure 9:
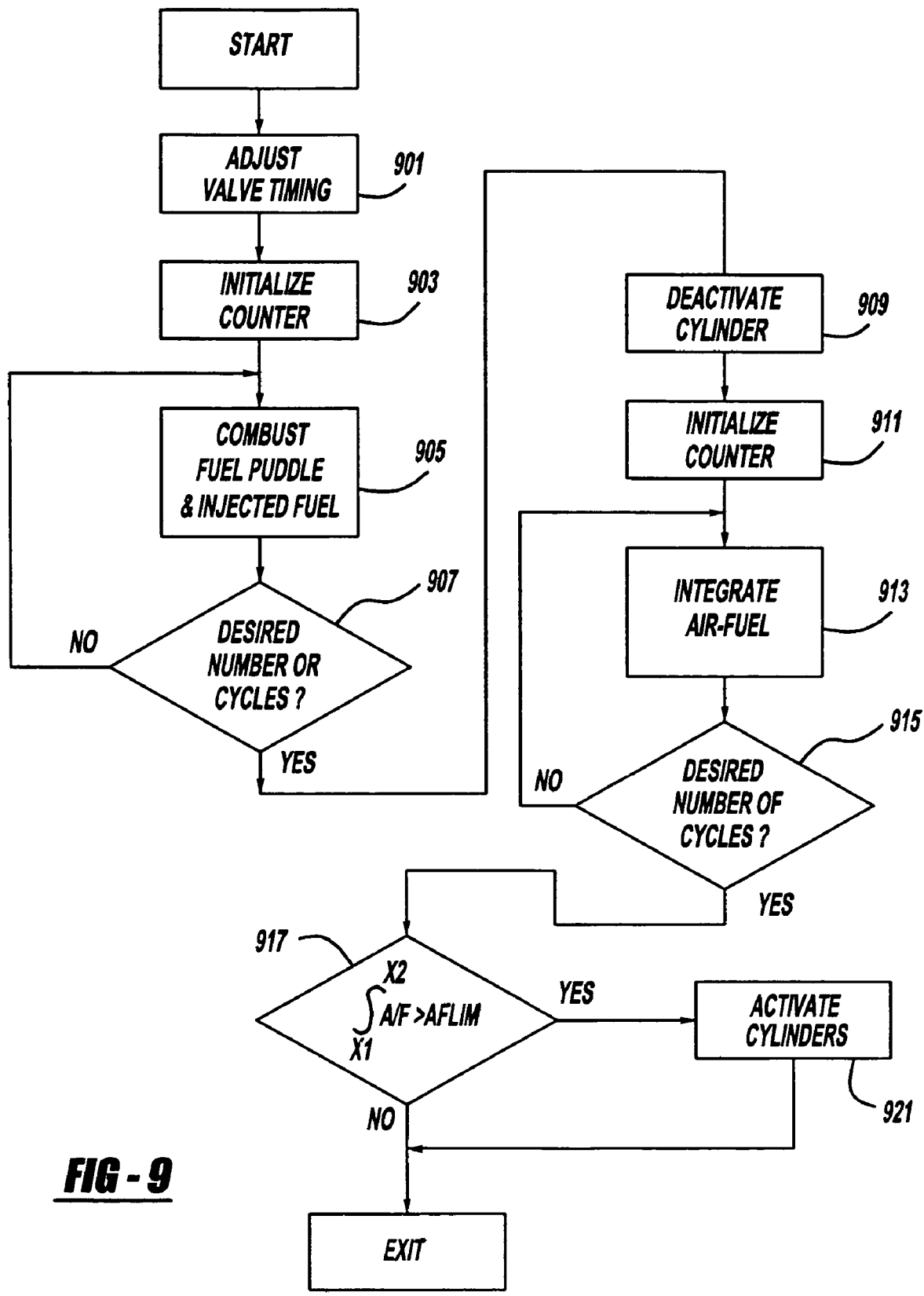
FIG. 9 is an alternate flow chart of another example method to determine valve degradation for a deactivated cylinder.

Referring to FIG. 9, a flow chart of an alternate method for determining valve degradation for a deactivated cylinder is shown. The routine may be started after control logic interprets engine operating conditions and determines that cylinder deactivation may be desired. Furthermore, the routine may be started after a predetermined number of cylinder deactivation sequences.

In step 901, intake valve timing can be adjusted in an effort to reduce intake port fuel puddles. By opening intake valves at a position that may be retarded from TDC (e.g., between 0 and 60° after TDC) intake stroke, the velocity of the inducted air mass may be increased. This can increase the port air velocity and the sheer force that it may exert on the fuel puddle so that fuel drawn from the puddle into the cylinder may increase. Further, valve timing and fuel injection can be adjusted in response to a request to deactivate a cylinder by the method shown in U.S. patent application Ser. No. 10/805,648, which is herein fully incorporated by reference. The intake valve closing can also be adjusted during this step so that the desired torque may be delivered at the retarded valve timing. The routine proceeds to step 903.

In step 903, a counter that can determine the number of cylinder cycles is initialized. The counter can keep count of the number of full cylinder cycles for individual cylinders after a request to deactivate a cylinder is made. The routine proceeds to step 905.

In step 905, induced intake port fuel puddle mass can be factored into the amount of fuel that may be injected and combusted in cylinders that are scheduled for deactivation. Fuel puddle mass can be determined with the method in accordance with U.S. Pat. No. 5,746,183 and is hereby fully incorporated by reference. The amount of fuel to be injected can be expressed as:

$$m_{f_{inj}}^k = \frac{m_{f_{des}}^k - m_p^{k-1}\left(\frac{1}{1+\tau}\right)}{1-X}$$

Where $m_{f_{des}}^k$ is the desired mass of fuel in an individual cylinder for event k, $M_{f_{inj}}^k$ is the mass of fuel to be injected before event k, $m_p^{k-1}$ is the mass of fuel in the intake port puddle before event k, X is the portion of injected fuel that enters the intake port fuel puddle, and $\tau$ is a time constant describing decay of the intake port fuel puddle. The desired cylinder fuel mass for event k can be determined by multiplying an individual cylinder air amount by a desired air-fuel ratio. Typically, the desired air-fuel ratio can be looked up in a table or function that may be indexed by engine speed and load. Cylinder air amount can be determined by known methods that may use a mass air flow sensor (MAF) sensor (not shown) positioned upstream of throttle 125 and/or MAP sensor 122. The variable X can be expressed as a function of manifold pressure, engine speed, and intake valve opening position. The variable $\tau$ can be expressed as a function of engine temperature, time since start, and valve opening position. Both X and $\tau$ variables can be stored in tables or functions and may be based on empirically determined data. In addition, X and $\tau$ may be stored in separate tables or functions for cylinders having degraded valves, operating cylinders, and deactivated cylinders. In other words, X and $\tau$ terms can come from three sets of tables, one set representing terms for a cylinder having at least a degraded valve, another set of representing terms during cylinder deactivation and the other set representing terms when combustion may be occurring in a cylinder. Furthermore, three puddle mass estimates may be made for each cylinder, one estimate based on valve degradation, one based on an active cylinder, and another based on cylinder deactivation. This allows engine controller 12 to reactivate a cylinder in response to whether a valve may be degraded or is not degraded during cylinder deactivation. In this way, the fuel injected to restart the cylinder can be adjusted in response to valve degradation. The routine continues to step 907.

In step 907, a decision to proceed based on the number of cylinder events having retarded valve timing is made. It may be desirable to operate a cylinder for more than one cylinder cycle following intake valve adjustment. By operating an engine for more than one event the fuel puddle mass may equilibrate at a lower mass. As mentioned above, adjusting intake valve timing can affect the intake port fuel puddle mass, but the entire effect of the timing change may not be observed after a single cylinder cycle. Therefore, a predetermined number of cylinder cycles may have to be completed before continuing on to cylinder deactivation. The predetermined number of cycles may be a constant or alternatively a function of engine speed and temperature, for example. If the cylinder selected to be deactivated has operated for a predetermined number of cylinder cycles the routine proceeds to step 909, if not the routine returns to step 905.

In steps 909, 911, 913, 915, 917, and 921 the routine performs the same operations as those described by steps 801, 803, 805, 807, 809, and 811 of FIG. 8, with the exception of steps 913 and 917. The description of the common steps can be taken from FIG. 8 and have therefore been omitted in the description of FIG. 9 to reduce redundancy.

In step 913, exhaust gas air-fuel ratio can be integrated, valve timing adjusted, and the intake port fuel puddle mass may be updated. The integration and valve adjustments performed in step 913 are the same as that described in step 805 of FIG. 8. The intake port puddle mass can continue to be calculated by the same method described in step 905. In particular, three fuel puddle masses are determined for each cylinder that has been commanded to be inactive, one for a deactivated cylinder, one for an operating cylinder, and one for a degraded deactivated cylinder.

In step 917, valve degradation can be determined and an intake puddle fuel mass may be passed to a fuel control routine that controls fuel in response to a injection equation described in step 905. The integrated air-fuel can be compared to a predetermined variable AFLIM. If AFLIM is less than the integrated air-fuel, valve degradation may not be determined and the routine exits. As part of the exit process, an intake port fuel puddle mass estimate can be passed to a fuel control algorithm having fuel calculations that may be based on those described in step 905, for example. Otherwise, valve degradation can be determined and the routine may pass an intake port puddle mass that may be based on degraded valve operation to a fuel control algorithm having fuel calculations that may be based on those described in step 905 and proceeds to step 811.

As will be appreciated by one of ordinary skill in the art, the routines described in FIGS. 8 and 9 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A method to determine valve degradation for a valve that may control flow of a cylinder for an internal combustion engine, the method comprising:
    deactivating a cylinder by stopping fuel flow to said cylinder;
    commanding at least a valve from a first group of valves that may control flow to said cylinder to a closed position for at least a cycle of said cylinder, after stopping said fuel flow to said cylinder;
    opening and closing at least a valve from a second group of valves that may control flow to said cylinder during the period said first group of valves is commanded closed; and
    sensing engine exhaust gases for an indication of a degraded valve in said first group.

2. The method of claim 1 wherein said first group of valves is a group of exhaust valves and wherein said second group of valves is a group of intake valves.

3. The method of claim 1 wherein said sensing exhaust gases is preformed using an oxygen sensor.

4. The method of claim 1 wherein the opening duration of said second group of valves may be varied in response to engine operating conditions.

5. The method of claim 1 further comprising reactivating said cylinder when said degraded valve is indicated.

6. The method of claim 1 further comprising delaying said opening and closing at least a valve for a predetermined number of cylinder cycles after commanding said at least a valve from said first group of cylinders to a closed position.

7. A method to determine valve degradation for a valve that may control flow of a cylinder for an internal combustion engine, the method comprising:
    operating said engine in a mode having at least one cylinder with exhaust valves that are commanded to a closed position for at least a cycle of said cylinder;
    opening at least an intake valve of said cylinder during at least a portion of the duration that said exhaust valves are commanded to said closed position; and
    monitoring a sensor output for an indication of said exhaust valve being at least partially open for at least a portion of said duration that said exhaust valves are commanded to said closed position.

8. The method of claim 7 wherein said sensor is an oxygen sensor.

9. The method of claim 7 wherein said sensor is a NOx sensor.

10. The method of claim 7 wherein said intake valve is a electrically actuated valve.

11. The method of claim 7 wherein said exhaust valves are mechanically actuated.

12. The method of claim 8 wherein said indication is an indication of a lean exhaust gas mixture.

13. A method to determine valve degradation for a valve that may control flow of a cylinder for an internal combustion engine, the method comprising:
    stopping fuel delivery to said cylinder after a request to deactivate said cylinder;
    commanding exhaust and intake valves of said cylinder to closed positions after stopping said fuel delivery;
    combusting any air-fuel mixture in said cylinder after said commanding exhaust and intake valves closed;
    opening and closing at least an intake valve of said cylinder after a predetermined number of cylinder strokes following said command to close said intake valve; and
    sampling exhaust gases for an indication that at least one of said exhaust valves is at least partially open when said exhaust valves are commanded to said closed position.

14. The method of claim 13 wherein said sampling exhaust gases is performed by an oxygen sensor.

15. The method of claim 13 wherein said intake valve is an electrically actuated valve.

16. The method of claim 13 wherein said exhaust valve is a mechanically actuated valve.

17. The method of claim 13 wherein said predetermined number of cylinder strokes is based on a pressure in said cylinder.

18. The method of claim 13 wherein said indication that at least one of said exhaust valves is open is a lean air-fuel mixture.

19. A method to determine valve degradation for a valve that may control flow of a cylinder for an internal combustion engine, the method comprising:
    selecting a cylinder to be deactivated; retarding intake valve timing of an intake event of said cylinder such that intake valve opening occurs after intake stroke top-dead-center of said cylinder in response to selection of said cylinder;
    deactivating fuel delivered to said cylinder by a time no later than the closing of said intake valve during said intake valve event;
    combusting an air-fuel mixture in said cylinder;
    commanding exhaust valves of said cylinder to close so that said exhaust valves are closed, for at least a cycle of said cylinder, after exhausting said combusted air-fuel mixture;
    adjusting intake valve timing of said cylinder after combusting said air-fuel mixture; and
    sampling exhaust gases for an indication that at least one of said exhaust valves is at least partially open when said exhaust valves are commanded to said closed position.

20. The method of claim 19 further comprising reactivating said cylinder when said exhaust valve is at least partially open.

21. A computer readable storage medium having stored data representing instructions executable by a computer to control valves in a cylinder of an internal combustion engine of a vehicle, said storage medium comprising:

instructions for deactivating a cylinder by stopping fuel flow to said cylinder;

instructions for commanding at least a valve from a first group of valves that may control flow to said cylinder to a closed position for at least a cycle of said cylinder, after stopping said fuel flow to said cylinder;

instructions for opening and closing at least a valve from a second group of valves that may control flow to said cylinder during the period said first group of valves is commanded closed; and instructions for sensing engine exhaust gases for an indication of a degraded valve in said first group.

* * * * *